(No Model.)
N. B. MILLER.
PACKING.
No. 524,178. Patented Aug. 7, 1894.
FIG 1.
FIG 2.
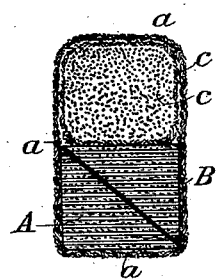
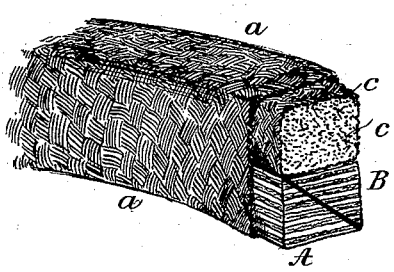
FIG 3. FIG 4.
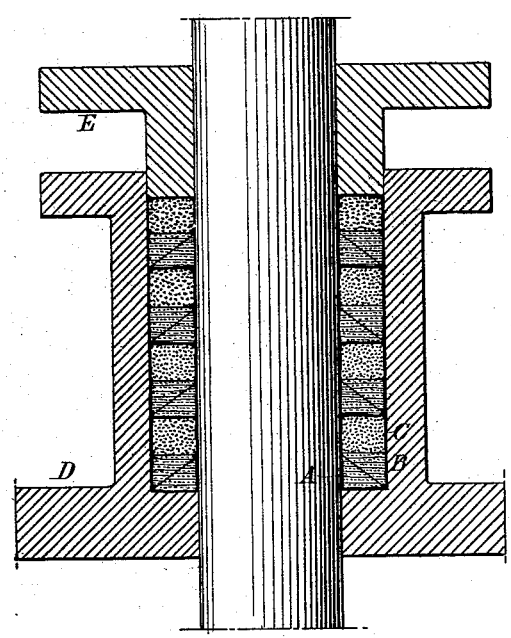
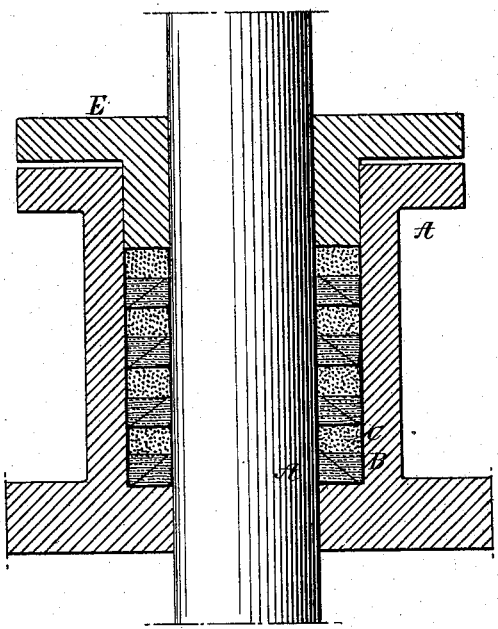
WITNESSES
K. D. Turner
Chas Amon
INVENTOR
Norman B. Miller
By his Attorneys
Howson & Howson

UNITED STATES PATENT OFFICE.

NORMAN BRUCE MILLER, OF PHILADELPHIA, PENNSYLVANIA, ASSIGNOR TO CHARLES A. DANIELS, OF SAME PLACE.

PACKING.

SPECIFICATION forming part of Letters Patent No. 524,178, dated August 7, 1894.

Application filed February 21, 1894. Serial No. 500,979. (No model.)

*To all whom it may concern:*

Be it known that I, NORMAN BRUCE MILLER, a citizen of the United States, residing in Philadelphia, Pennsylvania, have invented certain Improvements in Packing, of which the following is a specification.

The object of my invention is to make an improved packing which can be used until the sections forming the packing are completely worn and which will be steam and water tight yet will yield sufficiently to avoid undue friction.

In the accompanying drawings:—Figure 1, is a perspective view of a section of my improved packing. Fig. 2, is a sectional view. Fig. 3, is a view of the packing arranged in a stuffing box. Fig. 4, is a view showing the packing after considerable wear.

A and B are sections wedge shaped in cross section the beveled edge of one section resting against the beveled edge of the other section; so that when pressure is applied one will slide upon the other. The sections A and B are made of flexible material, preferably of layers of cotton duck and rubber, the duck and rubber are alternately arranged and so united under pressure as to make the sections comparatively stiff yet they will yield sufficiently to snugly fit in the box and against the piston rod. I place between the two wedge shaped sections A and B a lubricant preferably finely divided graphite so that one will readily slide upon the other.

At the back of the section B, in the present instance, is a cushion C made of absorbent material, preferably twisted cotton which allows for the free action of the wedge shaped sections A and B and is an absorbent for oils and thus presents an excellent lubricating surface and also prevents the packing from becoming hard and transmits the lateral pressure evenly throughout the series of layers of packing.

The cushion section C is confined in a braided covering c and the covered cushion and sections A and B are confined within an outer braided covering a, which holds the several parts of the packing in place so that they can be readily applied to the stuffing box without requiring careful manipulation and adjustment.

The packing is either cut in suitable lengths and placed within the stuffing box, one length of packing against another and so arranged that the wedge shaped section A of one length, abuts the cushion C of the adjoining length or, if convenient, the packing may be coiled into the stuffing box.

As shown in Fig. 3, the packing is cut in lengths and placed within the stuffing box D and the gland E is pressed against the packing and it will be noticed that when the packing is compressed the yielding cushion distributes the pressure evenly throughout the entire length of the packing and when the sections A and B wear, by placing pressure upon the gland the section A will be forced toward the piston rod and the section B will be forced against the shell of the box, as shown in Fig. 4.

I claim as my invention—

1. The combination in a packing strip, of the wedge shaped sections A and B the inclined surfaces of said sections adjoining, with a yielding cushion back of one of said sections, the whole confined within a casing, substantially as described.

2. The combination in a packing, of the wedge shaped sections A and B, the inclined surfaces of each section adjoining, with an absorbent cushion confined in a braided casing and situated back of one of said sections, the whole combined in an outer casing, substantially as described.

In testimony whereof I have signed my name to this specification in the presence of two subscribing witnesses.

NORMAN BRUCE MILLER.

Witnesses:
H. F. REARDON,
WILLIAM A. BARR.